(12) United States Patent
Sumitomo et al.

(10) Patent No.: US 7,079,179 B2
(45) Date of Patent: Jul. 18, 2006

(54) IMAGE PROCESSING APPARATUS FOR PERFORMING IMAGE RESTORATION

(75) Inventors: Hironori Sumitomo, Osaka (JP); Mutsuhiro Yamanaka, Osaka (JP)

(73) Assignee: Minolta Co., Ltd., Osaka (JP)

( * ) Notice: Subject to any disclaimer, the term of this patent is extended or adjusted under 35 U.S.C. 154(b) by 642 days.

(21) Appl. No.: 10/101,728

(22) Filed: Mar. 21, 2002

(65) Prior Publication Data

US 2002/0164082 A1    Nov. 7, 2002

(30) Foreign Application Priority Data

Mar. 23, 2001 (JP) ................ 2001-84099

(51) Int. Cl.
  *H04N 5/225* (2006.01)
  *H04N 5/235* (2006.01)
  *G06K 6/40* (2006.01)

(52) U.S. Cl. .................. 348/222.1; 382/261

(58) Field of Classification Search ............ 348/222.1, 348/241, 243, 244, 606, 607, 167, 260, 261, 348/262, 263, 264, 265

See application file for complete search history.

(56) References Cited

U.S. PATENT DOCUMENTS

| | | | | |
|---|---|---|---|---|
| 5,790,709 A | * | 8/1998 | Kopeika et al. | 382/254 |
| 5,925,875 A | * | 7/1999 | Frey | 250/208.1 |
| 6,154,574 A | * | 11/2000 | Paik et al. | 382/255 |
| 6,356,304 B1 | * | 3/2002 | Kawaguchi et al. | 348/222.1 |
| 6,418,243 B1 | * | 7/2002 | Skoglund et al. | 382/274 |
| 6,470,097 B1 | * | 10/2002 | Lai et al. | 382/255 |
| 6,535,632 B1 | * | 3/2003 | Park et al. | 382/164 |
| 6,628,715 B1 | * | 9/2003 | Iu et al. | 375/240.16 |
| 6,633,686 B1 | * | 10/2003 | Bakircioglu et al. | 382/294 |
| 6,822,758 B1 | * | 11/2004 | Morino | 358/1.9 |

FOREIGN PATENT DOCUMENTS

JP        06-054172        2/1994

OTHER PUBLICATIONS

"Super-Resolution Restoration of An Image Sequence —Adaptive Filtering Approach" Apr. 4, 1997, EDICS number - IP 1.12, Department of Electrical Engineering Technion —Israel Institute of Technology Haifa 32000, Israel.

* cited by examiner

*Primary Examiner*—David Ometz
*Assistant Examiner*—Justin P. Misleh
(74) *Attorney, Agent, or Firm*—McDermott Will & Emery LLP

(57) ABSTRACT

In an image processing apparatus for performing image restoration by utilizing iterative calculations based on a captured degraded image and a degradation function obtained in or before photographing, a residual is calculated in each time of iteration in the iterative calculations and the rate of variation from the previous residual to the newly obtained residual is calculated. When the rate of variation of the residual becomes equal to or lower than a predetermined threshold value, it is judged that the iterative calculations are converged.

13 Claims, 11 Drawing Sheets

| 1/5 | 1/5 | 0 | 0 | 0 |
| --- | --- | --- | --- | --- |
| 0 | 0 | 1/5 | 0 | 0 |
| 0 | 0 | 0 | 1/5 | 0 |
| 0 | 0 | 0 | 0 | 1/5 |

Fig. 10(C)

| 1/4 | 1/4 | 0 |
| --- | --- | --- |
| 1/4 | 1/4 | 0 |
| 0 | 0 | 0 |

…

IMAGE PROCESSING APPARATUS FOR PERFORMING IMAGE RESTORATION

This application is based on the application No. 2001-84099 filed in Japan, the content of which is hereby incorporated by reference.

BACKGROUND OF THE INVENTION

1. Field of the Invention

The present invention relates to an image processing apparatus. More particularly, the present invention relates to an image processing apparatus for restoring a degraded image obtained by an image capturing device (such as a digital camera) to provide an image close to its original image.

2. Description of the Related Art

An image obtained by an image capturing device such as a digital camera (hereinafter referred to as a captured image) is degraded due to out-of-focus photographing, camera-shake or aberration or the like. In typical image restoring processing, iterative calculations are performed for removing the degradation and restoring the captured image to an image close to its original image.

In the iterative calculations, a residual (pixel output difference before and after the iterative calculation) may be computed in each time of iteration and convergence judgment may be carried out until the calculation result becomes below a predetermined threshold value. In such a case, the number of iterations may sometimes be excessive or insufficient for some images so that noises are generated, which hinders desired image restoration. Although a method of setting the number of iterations in advance is proposed by Japanese Patent Application Laid-Open No. 06-54172 for example, it is not yet known based on what the number of iterations should be determined for realizing highly accurate image restoration.

An object of the present invention, which is conceived under the circumstances described above, is to provide an apparatus capable of performing highly accurate image restoration without being influenced by an image.

SUMMARY OF THE INVENTION

For achieving the above-described object, an image processing apparatus according to the present invention comprises: a image processor for performing an image restoration by utilizing iterative calculations based on a captured image and a degradation function; a first calculator for calculating a residual at each time of iteration in the iterative calculations; a second calculator for calculating a rate of variation of the residual calculated by the first calculator; and a judger for judging that the iterative calculations are converged when the rate of variation calculated by said second calculator becomes equal to or lower than a predetermined threshold value.

According to the present invention, by conducting convergence judgment based on the rate of residual variation, it is possible to conduct highly accurate image reproduction without being influenced by the image.

For achieving the above-described object, another image processing apparatus according to the present invention comprises: a image processor for performing an image restoration by utilizing iterative calculations based on a captured image and a degradation function; and a setter for setting a number of iterative calculations in accordance with a photographing state of the captured image, wherein said image processor conducts iterative calculations the number of times set by said setter.

According to the present invention, the computing time can be shortened also by controlling the number of iterations based on the photographing state of the captured image.

In the following description, like parts are designated by like reference numbers throughout the several drawings.

BRIEF DESCRIPTION OF THE DRAWINGS

FIG. 10 schematically illustrates degradation function represented as two-dimensional filters.

DETAILED DESCRIPTION OF THE PREFERRED EMBODIMENT

An image processing apparatus embodying the present invention will be described below with reference to the accompanying drawings. The present invention relates to image restoration processing wherein information on image degradation (hereinafter referred to as a "degradation function") is obtained from an image input section of an apparatus for example, and an un-degraded image (hereinafter referred to as a "restored image") is conjectured from the degraded captured image by utilizing iterative calculations. The present invention particularly relates to a method of end judgment of the iterative calculations. The principle of image restoration processing is discussed, for example, in "M. Elad and A. Feuer; Super-Resolution of An Image Sequence—Adaptive Filtering Approach; Technion—Israel Institute of Technology, 4 Apr. 1997". It is to be noted that the above-described degradation function includes, for example, information obtained in or before photographing with respect to camera-shake, out-of-focus photographing, aberration, an optical low-pass filter or the like.

<First Embodiment>

Figure 1A:
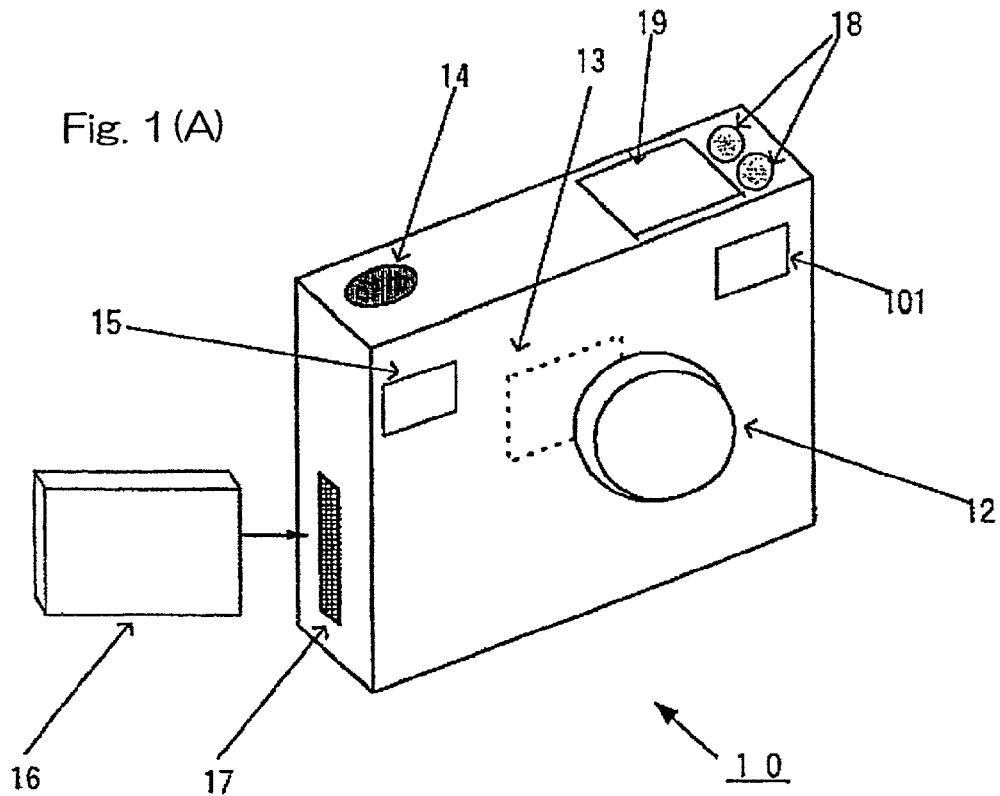
FIG. 1 illustrates an external appearance of a digital camera in accordance with a first embodiment of the present invention.
Figure 1B:
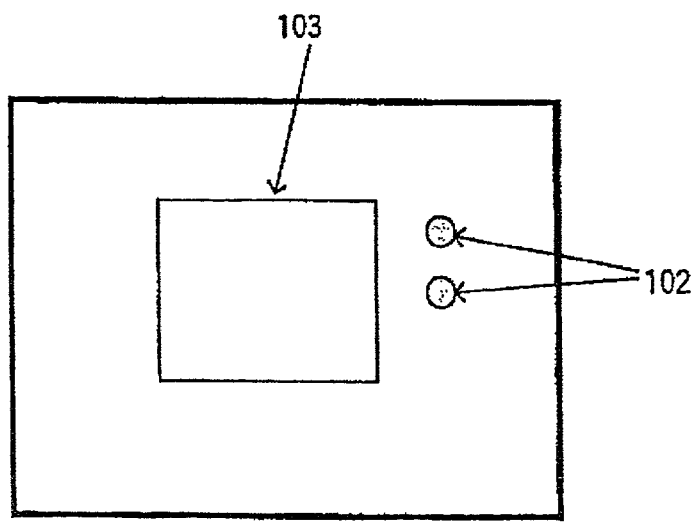

A first embodiment of the present invention will be described below. FIG. 1 illustrates an external appearance of a digital camera 10 in accordance with a first embodiment of the present invention. Specifically, FIG. 1(A) illustrates the appearance of the digital camera 10 as viewed from the front, whereas FIG. 1(B) illustrates a rear side 100 of the digital camera 10. As shown in FIG. 1(A), the digital camera includes a photographing lens 12, an image capturing CCD (Charge Coupled Device) 13 built in the camera, a release button 14, a finder window 15, a recording medium 16, an insertion slot 17 for the recording medium 16, a photographing mode setting key 18, a liquid crystal panel 19 and a distance measurement window 101. Further, in FIG. 1(B), indicated by reference numeral 102 are image processing setting keys, whereas indicated by reference numeral 103 is a liquid crystal monitor.

The photographing mode setting key 18 as well as the liquid crystal panel 19 is utilized for the setting of an exposure condition (such as aperture-priority or shutter speed-priority), macro photography, and zooming or the like. Further, the image processing setting keys 102 together with the liquid crystal display monitor are utilized for determining the necessity for image restoration processing. Similarly to ordinary digital cameras, the digital camera 10 is capable of recording an image captured by the CCD 13 in the recording medium 16. Further, the digital camera 10 has the function of image restoration processing. The digital camera 10 automatically carries out the image restoration processing in accordance with a degradation function. Of course, the necessity for the image restoration processing may be determined by the user by the use of the image processing setting keys 102.

Figure 2:
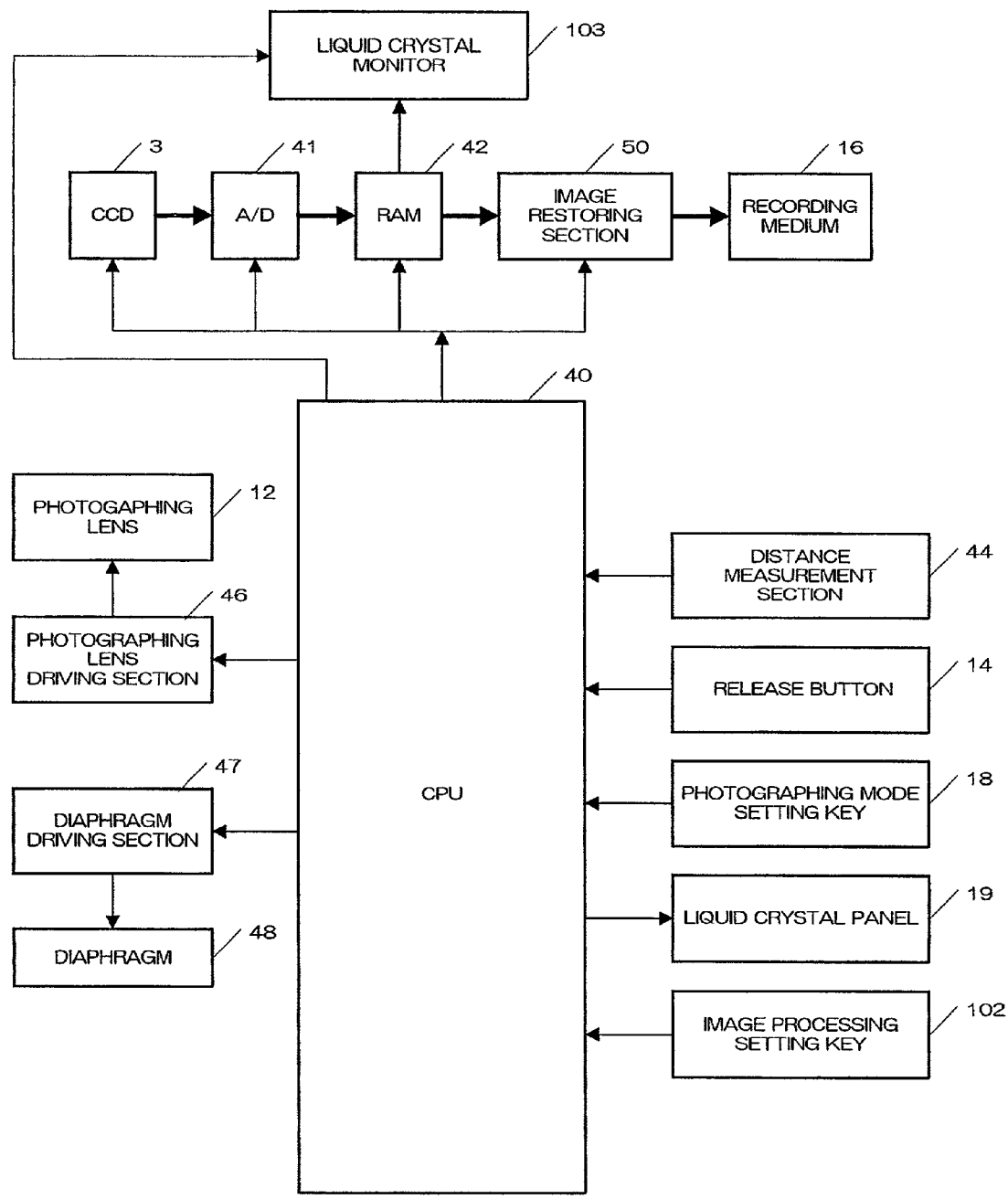
FIG. 2 is a block diagram showing the schematic structure of the first embodiment.

FIG. 2 is a block diagram of the digital camera 10. In this figure, thin arrows indicate the flow of control data, whereas thick arrows indicate the flow of image data. Now, description will be given below with reference to FIG. 2. As shown in FIG. 2, the digital camera is provided with a CPU (central processing unit) 40, an A/D converter 41, a RAM (random access memory) 42, a distance measurement section 44, a photographing lens driving section 46, a diaphragm driving section 47, a diaphragm 48 and an image restoring section 50.

First, by using the photograph mode setting key 18, the user selects and sets conditions such as an exposure condition. When the setting of the digital camera 10 is completed, the user sees an object and press the release button 14. Thus, the object distance is measured by the distance measurement section 44. Based on the distance measurement result, the photographing lens driving section 46 drives the photographing lens 12, and the diaphragm driving section 47 sets the diaphragm 48 to a suitable value. Then, charge storage by the CCD 13 is performed for reading out the image data. Then, by a pipeline system, the image data thus read out is converted at the A/D converter 41 into digital data and temporarily stored in the RAM 42. Subsequently, image restoring section 50 conducts the image restoration processing by utilizing the captured image stored in the RAM 42. This processing will be described later in detail. The restored image thus obtained is recorded in the recording medium 16. The above is the flow of forming a restored image from a captured image.

Figure 3:
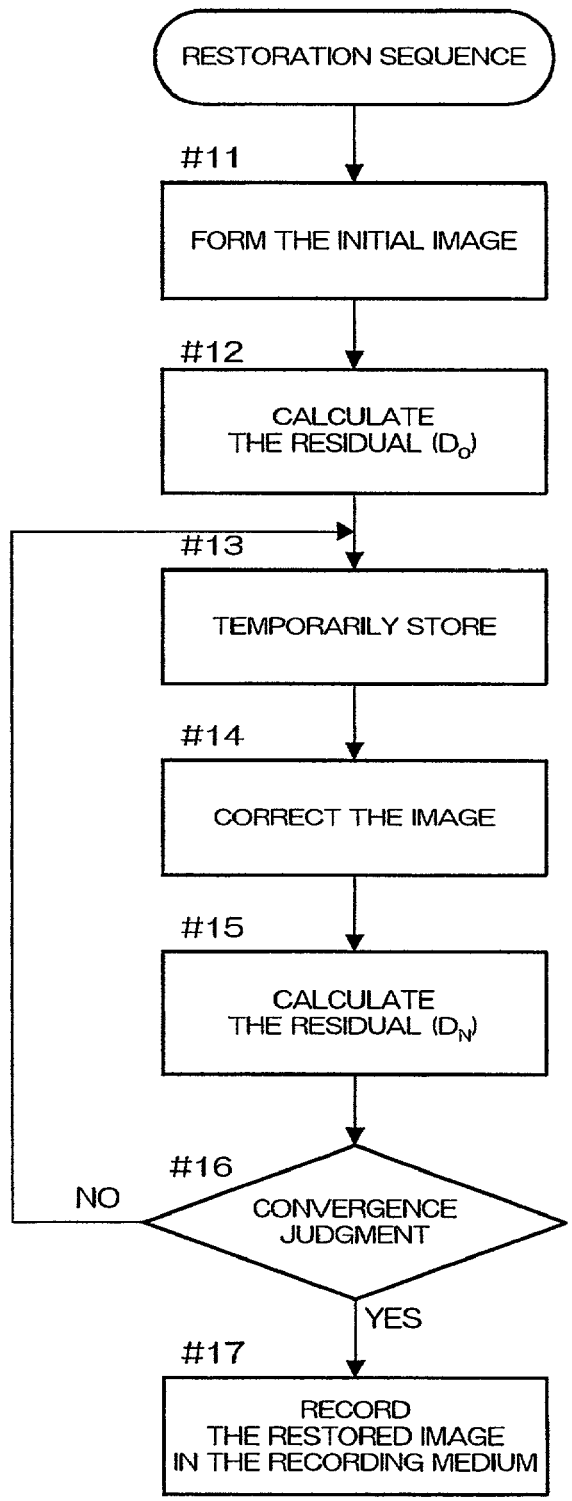
FIG. 3 is a flow chart showing the restoration sequence of the first embodiment.

FIG. 3 illustrates the flow of a restoration sequence by the image restoring section 50. Now, description will be made below with reference to FIG. 3. First, an assumed pre-degradation image (hereinafter referred to as an "initial image") necessary for the image restoration processing is formed from the captured image stored in the RAM 42 (#11). The initial image may be formed by performing edge emphasizing filtering in the case where sharp edges are degraded due to out-of-focus for example. Alternatively, the captured image may be utilized, as it is, as the initial image without undergoing any processing. After the initial image is formed, the initial image $X_0(i,j)$ is degraded by utilizing a degradation function H obtained in photographing, and a difference (residual $D_0$) from the captured image $Y(i,j)$ is calculated (#12). This is represented by the formula (1) given below.

$$D_0 = \sum_{i=1}^{M}\sum_{j=1}^{N} \|Y(i,j) - H \cdot X_0(i,j)\|^2 \quad (1)$$

where i and j are natural numbers; M is the number of pixels in a column; and N is the number of pixels in a row.

The residual $D_0$ thus calculated as well as the initial image $X_0(i,j)$ are temporarily stored in the RAM 42 (#13). After the calculation of the residual, image correction is performed from the initial image $X_0(i,j)$ stored in the RAM 42, the degradation function H obtained in photographing and the captured image $Y(i,j)$, and the initial image $X_0(i,j)$ is renewed to provide a new image $X_1(i,j)$ (hereinafter referred to as a "renewed image") (#14). Subsequently, a residual $D_1$ is calculated from the renewed image $X_1(i,j)$, the degradation function H and the captured image $Y(i,j)$ (#15). This is represented by the formula (2) given below.

$$D_0 = \sum_{i=1}^{M}\sum_{j=1}^{N} \|Y(i,j) - H \cdot X_n(i,j)\|^2 \quad (2)$$

where n is the number of iterations (n=1, 2, . . . ); i and j are natural numbers; M is the number of pixels in a column; and N is the number of pixels in a row.

After the calculation of the residual $D_1$, it is judged whether the following relationship (3) is satisfied with respect to the residual $D_0$ temporarily stored in the RAM 42 and the calculated residual $D_1$ (#16).

$$D_{n-1} - D_n < K \times D_{n-1} \quad (3)$$

where K is a constant smaller than 1.

Herein, it is preferable to set K to $\frac{1}{400}$ for example, but it is not limitative. If No in the convergence judgment in Step #16, the process returns to Step #13 to carry out a second iterative calculation. Specifically, the residual $D_0$ and the initial image $X_0(i,j)$ temporarily stored in the RAM 42 are deleted, and the newly obtained residual $D_1$ and the renewed image $X_1(i,j)$ are temporarily stored in the RAM 42. Then, image correction is performed from the renewed image $X_1(i,j)$ temporarily stored in the RAM 42, the degradation function H obtained in photographing and the captured image $Y(i,j)$, and the initial image $X_1(i,j)$ is renewed to provide a new renewed image $X_2(i,j)$ (#14). Subsequently, a residual $D_2$ is calculated from the renewed image $X_2(i,j)$, the degradation function H and the captured image $Y(i,j)$ by utilizing the formula (2) (#15). Then, it is judged whether the above-described relationship (3) is satisfied with respect to the residual $D_1$ temporarily stored in the RAM 42 and the calculated residual $D_2$ (#16). If No in the convergence judgment in Step #16, the process returns to Step #13 to repeat the same process steps. If Yes in the convergence judgment in Step #16, the renewed image $X_{n-1}(i,j)$ stored in the RAM 42 is recorded in the recoding medium 16 as a restored image (#17).

As described above, a residual is calculated in each time of iteration in the iterative calculations, and the rate of variation from the previous residual to the newly obtained residual is calculated. When the rate of variation becomes equal to or lower than a predetermined threshold value, it is judged that the iterative calculations are converged. By this method, it is possible to perform highly accurate image restoration without being influenced by the image. In this embodiment, the routine of the above-described restoration sequence is executed by the digital camera 10. However, the present invention is not limited thereto, and the restoration sequence may be loaded, as a software program, in a computer (such as a personal computer) via a recording medium such as a CD-ROM or a network so that the image restoration processing can be performed by the computer. Further, the image restoration processing may be executed via a communication network. This holds true for other embodiments which will be described later.

<Second Embodiment>

Figure 4A:
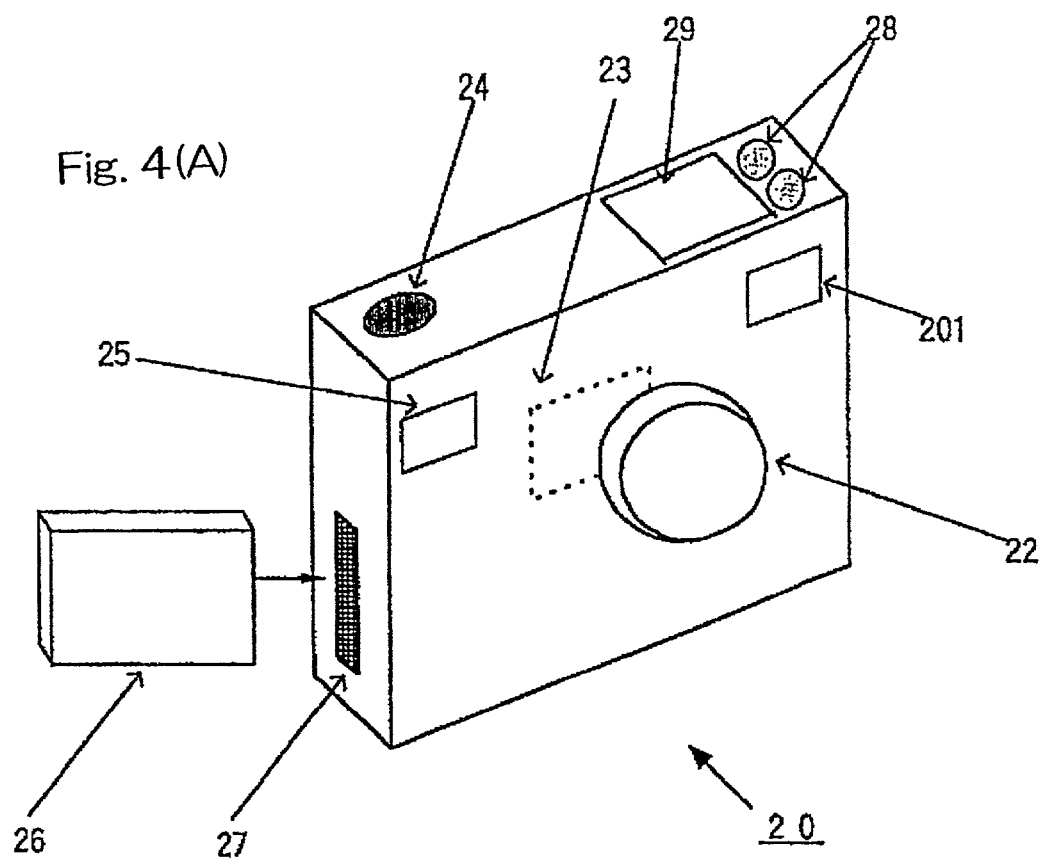
FIG. 4 illustrates an external appearance of a digital camera in accordance with a second embodiment of the present invention.
Figure 4B:
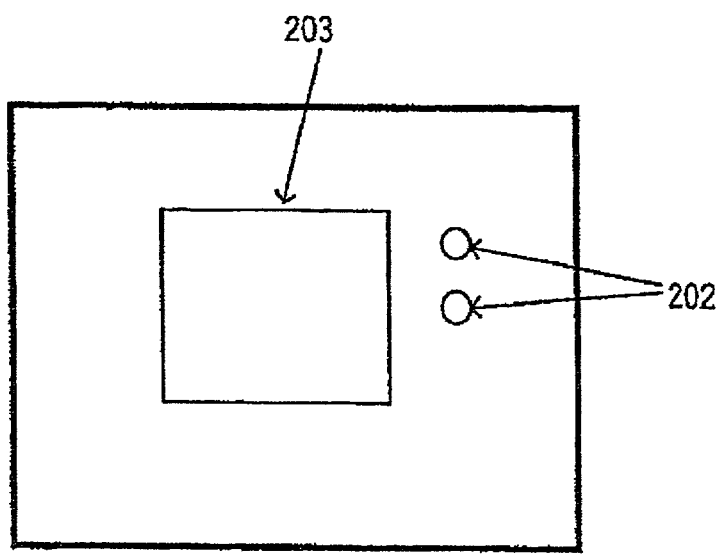

Now, a second embodiment of the present invention will be described. FIG. 4 illustrates an external appearance of a digital camera 20 in accordance with a second embodiment of the present invention. Specifically, FIG. 4(A) illustrates the appearance of the digital camera 20 as viewed from the front, whereas FIG. 2(B) illustrates a rear side 200 of the digital camera 20. As shown in FIG. 2(A), the digital camera includes a photographing lens 22, an image capturing CCD (Charge Coupled Device) 23 built in the camera, a release button 24, a finder window 25, a recording medium 26, an insertion slot 27 for the recording medium 26, a photographing mode setting key 28, a liquid crystal panel 29 and a distance measurement window 201. Further, in FIG. 4(B), indicated by reference numeral 202 are image processing setting keys, whereas indicated by reference numeral 203 is a liquid crystal monitor.

The photographing mode setting key 28 as well as the liquid crystal panel 29 is utilized for the setting of an exposure condition (such as aperture-priority or shutter speed-priority), macro photography, and zooming or the like. Further, the image processing setting keys 202 together with the liquid crystal display monitor are utilized for determining the necessity for image restoration processing. Similarly to ordinary digital cameras, the digital camera 20 is capable of recording an image captured by the CCD 23 in the recording medium 26. Further, the digital camera 20 has the function of image restoration processing. The digital camera 20 automatically carries out the image restoration processing in accordance with a degradation function. Of course, the necessity for the image restoration processing may be determined by the user by the use of the image processing setting keys 202.

Figure 5:
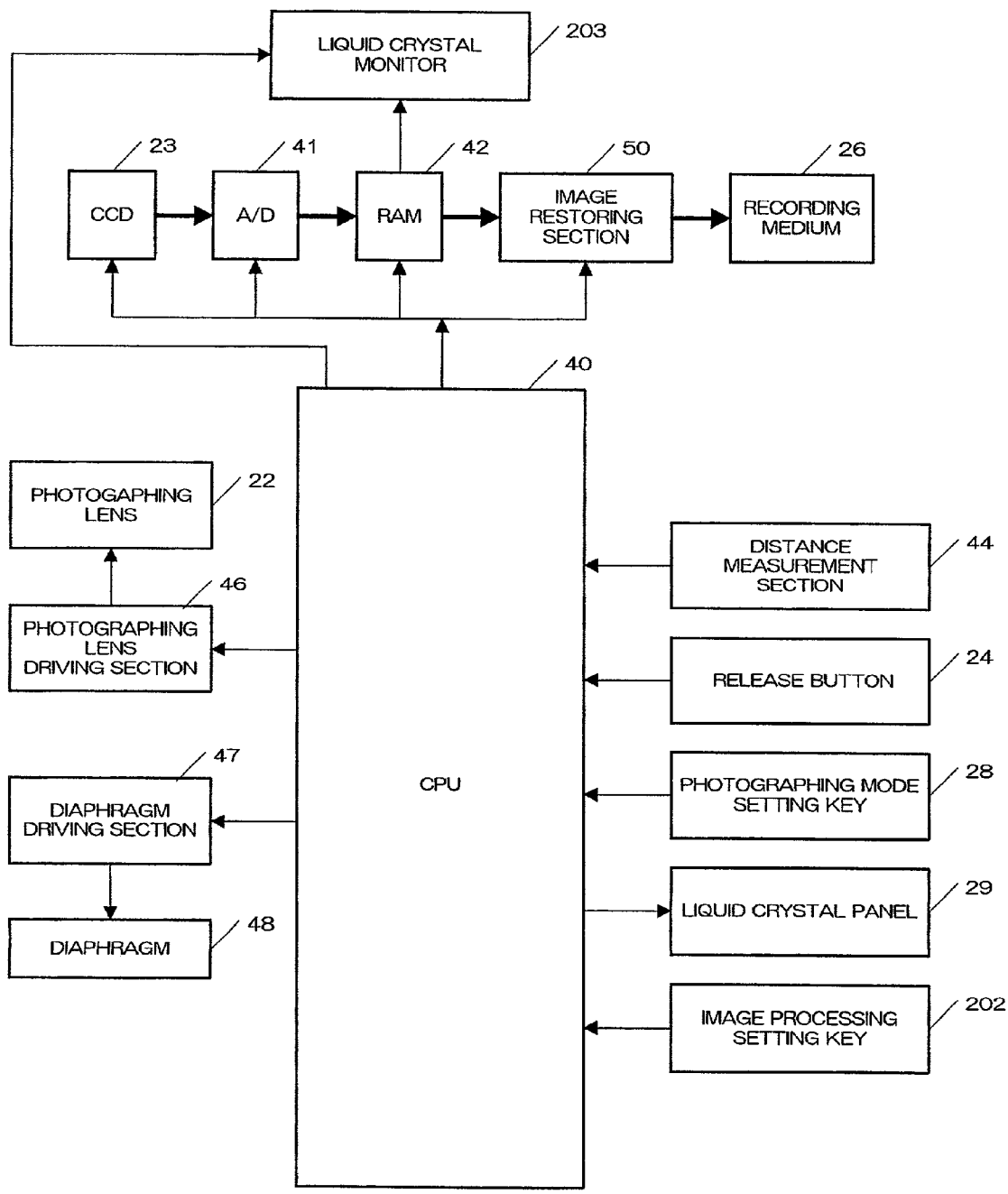
FIG. 5 is a block diagram showing the schematic structure of the second embodiment.

FIG. 5 is a block diagram of the digital camera 20. In this figure, thin arrows indicate the flow of control data, whereas thick arrows indicate the flow of image data. Now, description will be given below with reference to FIG. 5. As shown in FIG. 5, the digital camera is provided with a CPU (central processing unit) 40, an A/D converter 41, a RAM (random access memory) 42, a distance measurement section 44, a photographing lens driving section 46, a diaphragm driving section 47, a diaphragm 48 and an image restoring section 50.

Similarly to the first embodiment, by using the photograph mode setting key 28, the user selects and sets conditions such as an exposure condition. When the setting of the digital camera 20 is completed, the user sees an object and press the release button 24. Thus, the object distance is measured by the distance measurement section 44. Based on the distance measurement result, the photographing lens driving section 46 drives the photographing lens 22, and the diaphragm driving section 47 sets the diaphragm 48 to a suitable value. Then, charge storage by the CCD 23 is performed for reading out the image data. Then, by a pipeline system, the image data thus read out is converted at the A/D converter 41 into digital data and temporarily stored in the RAM 42. Subsequently, image restoring section 50 conducts the image restoration processing by utilizing the captured image stored in the RAM 42. This processing will be described later in detail. The restored image thus obtained is recorded in the recording medium 26. The above is the flow of forming a restored image from a captured image.

Figure 6:
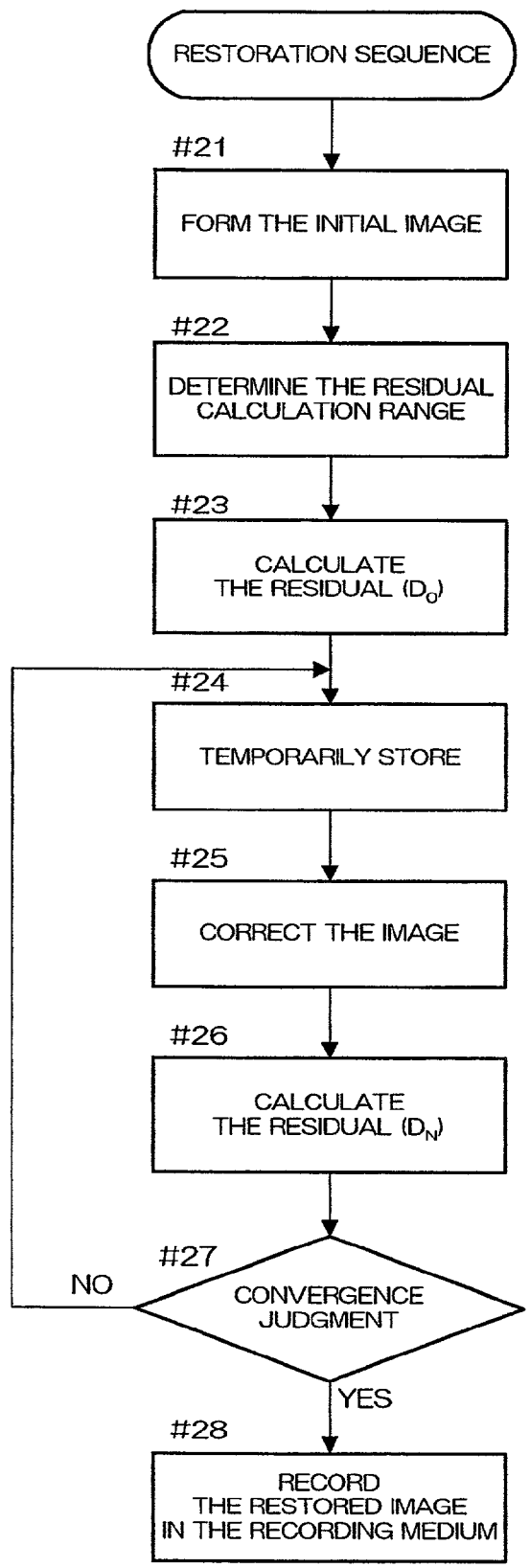
FIG. 6 is a flow chart showing the restoration sequence of a second embodiment.

FIG. 6 illustrates the flow of a restoration sequence by the image restoring section 50 according to the second embodiment of the present invention. Now, description will be made below with reference to FIG. 6. Similarly to the first embodiment, an initial image necessary for the image restoration processing is formed from a captured image stored in the RAM 42 (#21). Subsequently, a range for residual calculation is determined (#22).

When an image is degraded, a portion including a sharp edge (hereinafter referred to as an "edge portion") is most significantly influenced. Conversely, a portion free from texture (hereinafter referred to as a "non-edge portion" is little influenced by image degradation. In other words, the edge portion is the portion that need be restored in the image restoration processing. Therefore, instead of performing residual calculation with respect to an entire image, the portion which especially requires restoration (e.g. the edge portion of the image) is set as a range for residual calculation. For this purpose, a gradient image of the captured image is formed by utilizing an edge extracting filter. For the edge extracting filter, the method of Prewitt or the method of Sobel may be utilized for example. The gradient image thus formed is divided into several small blocks and an average value of brightness is calculated for each of the blocks. The small block which has the highest average value is set as a residual calculation range. Although the gradient image is formed from the captured image in this embodiment, the same result can be obtained in the case where the gradient image is formed from the initial image. After the residual calculation range is determined, the initial image $X_0(i,j)$ is degraded by utilizing a degradation function H obtained in photographing, and a difference (residual $D_0$) from the captured image Y(i,j) is calculated (#23). This is represented by the formula (4) given below.

$$D0 = \sum_{i=1}^{M_1} \sum_{j=1}^{N_1} \pi Y(i,j) - H \cdot X_0(i,j)\pi^2 \qquad (4)$$

where i and j are natural numbers; M1 is the number of pixels in an column of the small block; and N1 is the number of pixels in a row of the small block.

The residual $D_0$ thus calculated as well as the initial image $X_0(i,j)$ are temporarily stored in the RAM 42 (#24). After the calculation of the residual, image correction is performed from the initial image $X_0(i,j)$ stored in the RAM 42, the degradation function H obtained in photographing and the captured image Y(i,j), thereby providing a renewed image $X_1(i,j)$ (#25). Subsequently, a residual $D_1$ is calculated from the renewed image $X_1(i,j)$, the degradation function H and the captured image Y(i,j) (#26). This is represented by the formula (5) given below.

$$Dn = \sum_{i=1}^{M_1} \sum_{j=1}^{N_1} \|Y(i, j) - H \cdot Xn(i, j)\|^2 \qquad (5)$$

where n is the number of iterations (n=1, 2, . . . ); i and j are natural numbers; M1 is the number of pixels in a column of the small block; and N1 is the number of pixels in a row of the small block.

Similarly to the first embodiment, after the calculation of the residual $D_1$, it is judged whether the following relationship (6) is satisfied with respect to the residual $D_0$ temporarily stored in the RAM 42 and the calculated residual $D_1$ (#27).

$$D_{n-1} - D_n < K \times D_{n-1} \qquad (6)$$

where K is a constant smaller than 1.

Similarly to the first embodiment, if No in the convergence judgment in Step #27, the second iteration is performed. If Yes in the convergence judgment in Step #27, the renewed image $X_{n-1}(i,j)$ stored in the RAM 42 is recorded in the recoding medium 26 as a restored image (#28). When the target range for the iterative calculations is reduced as described above, it is possible to form a restored image more accurately than in the case where the residual for the entire image is calculated. Moreover, it is also possible to shorten the computation time.

<Third Embodiment>

Figure 7A:
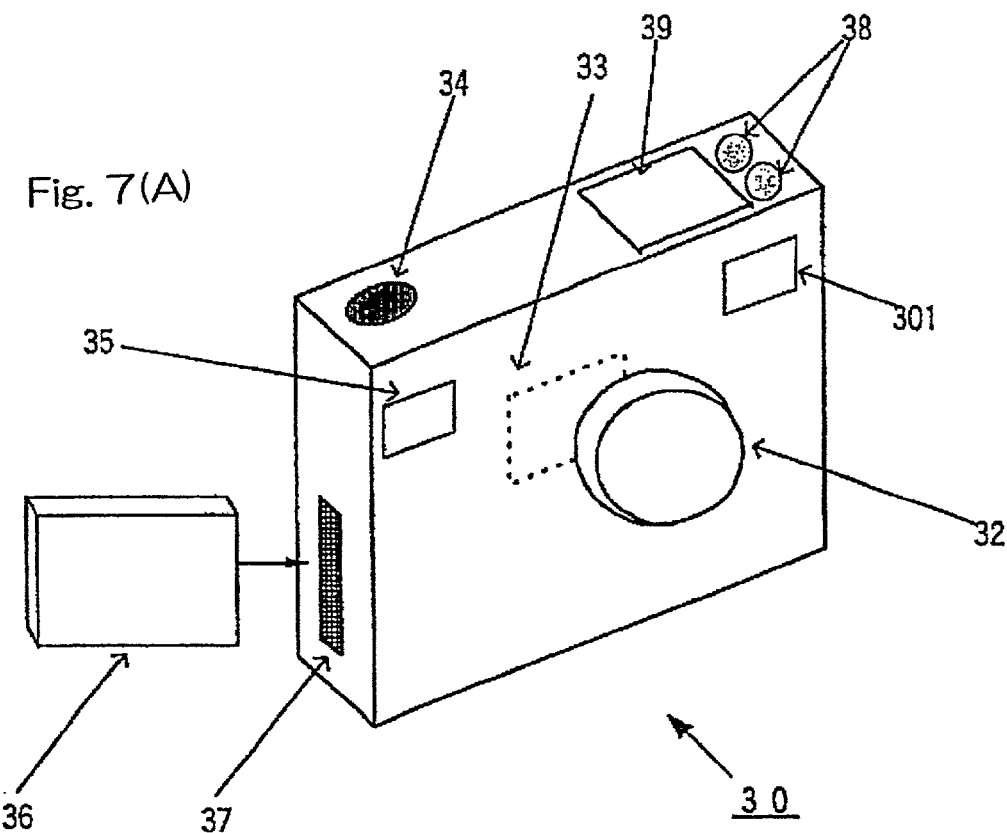
FIG. 7 illustrates an external appearance of a digital camera in accordance with a third embodiment of the present invention.
Figure 7B:
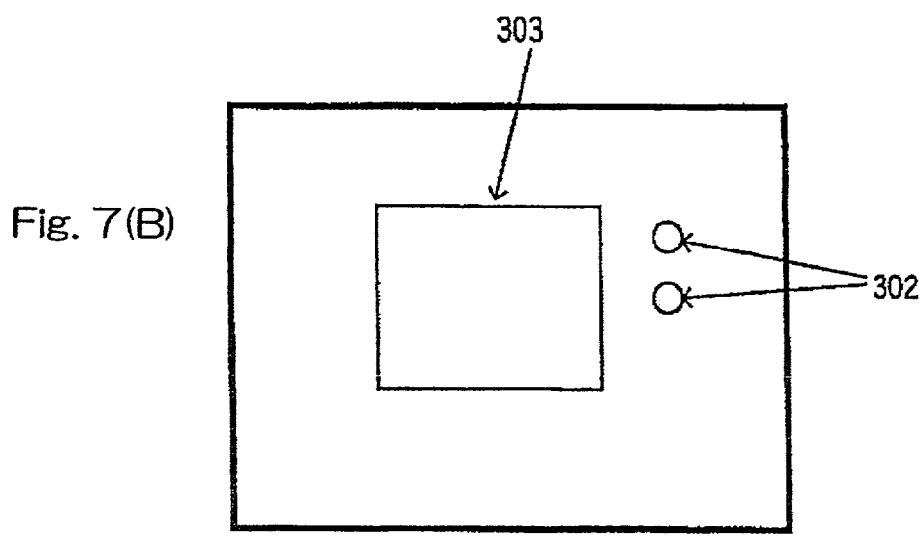

Next, a third embodiment of the present invention will be described. FIG. 7 illustrates an external appearance of a digital camera 30 in accordance with a second embodiment of the present invention. Specifically, FIG. 7(A) illustrates the appearance of the digital camera 30 as viewed from the front, whereas FIG. 7(B) illustrates a rear side 300 of the digital camera 30. As shown in FIG. 7(A), the digital camera includes a photographing lens 32, an image capturing CCD (Charge Coupled Device) 33 built in the camera, a release button 34, a finder window 35, a recording medium 36, an insertion slot 37 for the recording medium 36, a photographing mode setting key 38, a liquid crystal panel 39 and a distance measurement window 301. Further, in FIG. 7(B), indicated by reference numeral 302 are image processing setting keys, whereas indicated by reference numeral 303 is a liquid crystal monitor.

The photographing mode setting key 38 as well as the liquid crystal panel 39 is utilized for the setting of an exposure condition (such as aperture-priority or shutter speed-priority), macro photography, and zooming or the like. Further, the image processing setting keys 302 together with the liquid crystal display monitor are utilized for determining the necessity for image restoration processing. Similarly to ordinary digital cameras, the digital camera 30 is capable of recording an image captured by the CCD 33 in the recording medium 36. Further, the digital camera 30 has the function of image restoration processing. The digital camera 30 automatically carries out the image restoration processing in accordance with a degradation function. Of course, the necessity for the image restoration processing may be determined by the user by the use of the image processing setting keys 302.

Figure 8:
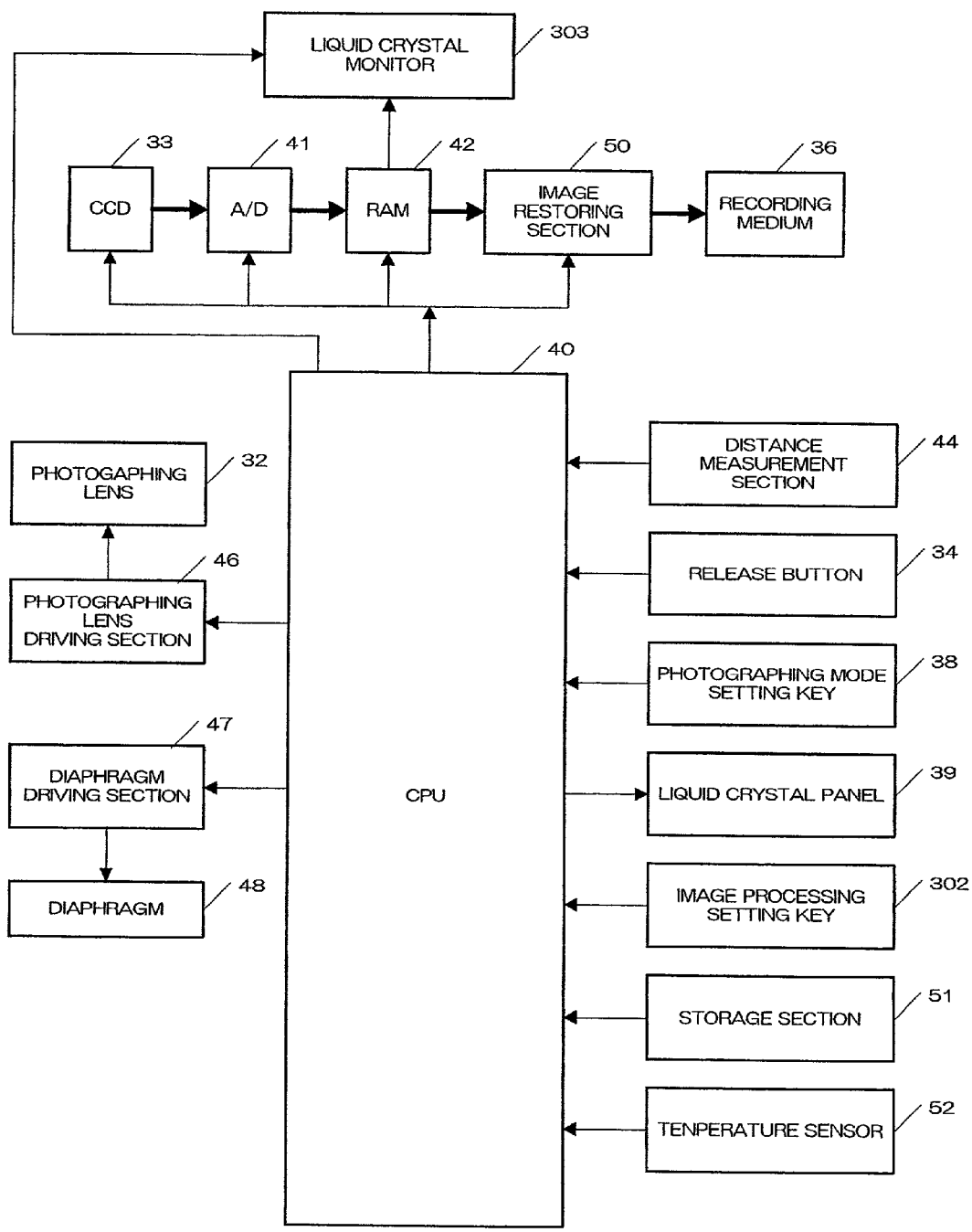
FIG. 8 is a block diagram showing the schematic structure of the third embodiment.

FIG. 8 is a block diagram of the digital camera 30. In this figure, thin arrows indicate the flow of control data, whereas thick arrows indicate the flow of image data. Now, description will be given below with reference to FIG. 8. As shown in FIG. 8, the digital camera is provided with a CPU (central processing unit) 40, an A/D converter 41, a RAM (random access memory) 42, a distance measurement section 44, a photographing lens driving section 46, a diaphragm driving section 47, a diaphragm 48 and an image restoring section 50.

In addition to the parts shown in the block diagram (FIG. 2) of the first embodiment, the digital camera 30 of this embodiment is provided with a storage section 51 and a temperature sensor 52 which are connected to the CPU 40 and which will be described later.

Similarly to the first embodiment, by using the photograph mode setting key 38, the user selects and sets conditions such as an exposure condition. When the setting of the digital camera 30 is completed, the user sees an object and press the release button 34. Thus, the object distance is measured by the distance measurement section 44. Based on the distance measurement result, the photographing lens driving section 46 drives the photographing lens 32, and the diaphragm driving section 47 sets the diaphragm 48 to a suitable value. Then, charge storage by the CCD 33 is performed for reading out the image data. Then, by a pipeline system, the image data thus read out is converted at the A/D converter 41 into digital data and temporarily stored in the RAM 42. Subsequently, image restoring section 50 conducts the image restoration processing by utilizing the captured image stored in the RAM 42. This processing will be described later in detail. The restored image thus obtained is recorded in the recording medium 36. The above is the flow of forming a restored image from a captured image.

Figure 9:
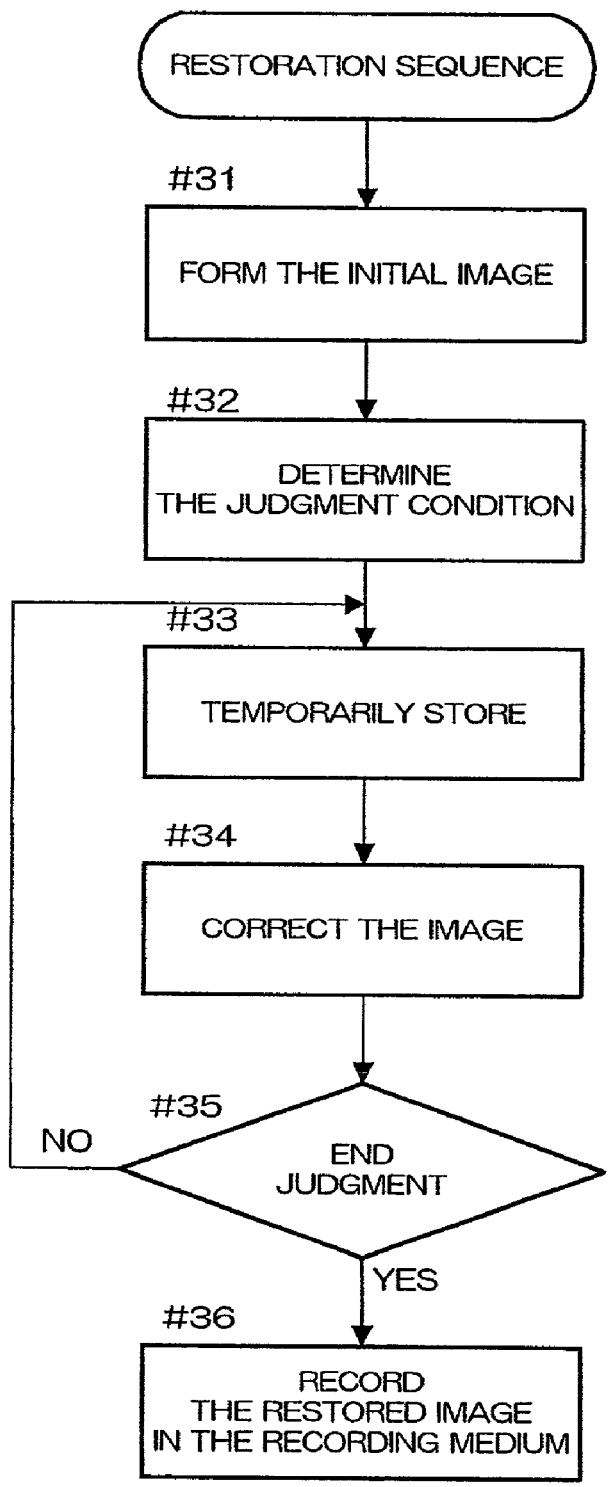
FIG. 9 is a flow chart showing the restoration sequence of a third embodiment.

FIG. 9 illustrates the flow of a restoration sequence by the image restoring section 50. Now, description will be made below with reference to FIG. 9. Similarly to the first embodiment, an initial image necessary for the image restoration processing is formed from a captured image stored in the RAM 42 (#31). Subsequently, a judgment condition for ending the iterative calculations is determined (#32).

The degradation function obtained in photographing may be in the form of a two-dimensional filter (hereinafter referred to as a "degradation filter"). For example, when camera-shake as indicated by the arrow in FIG. 10(A) occurs, the degradation filter has such a form as shown in FIG. 10(B). Further, in the case of an optical low-pass filter incorporated in an image capturing device such as a camera, the degradation filter has such a form as shown in FIG. 10(C). As is clear from FIGS. 10(B) and 10(C), the size of a degradation filter changes in accordance with the degree of degradation. In image restoration processing, the number of iterations greatly depends on the size of a degradation filter. In the case where the filter size is small as is for the optical low-pass filter, the number of iterations is small. Conversely, in the case where the filter size is large as is for the camera-shake, the number of iterations greatly increases.

Therefore, for a filter size of M×N, the number of iterations in image restoration processing is defined by the following formula (7). According to this formula (7), the number of iterations for the optical low-pass filter becomes 10 (See formula (8)), whereas the number of iterations for camera-shake in a lateral direction becomes 22 (See formula (9)).

$$ITER = [2.5 \times (M+N)] \qquad (7)$$

$$ITER = [2.5 \times (2+2)] = 10 \text{ times} \qquad (8)$$

$$ITER = [2.5 \times (5+4)] = 22 \text{ times} \qquad (9)$$

where [ ] is the Gauss' notation.

Although an example is described above, the method of calculation is not limited to the above example. Further, although the number of iterations is calculated in accordance with the filter size in the above-described example, a table may be in advance stored in the storage section 51 (See FIG. 8) and the number of iterations may be determined by utilizing the table. Moreover, instead of controlling the number of iterations in accordance with the filter size, the number of iterations may be controlled in accordance with the noise level of the image. This will be4 described below in detail.

Figure 11:
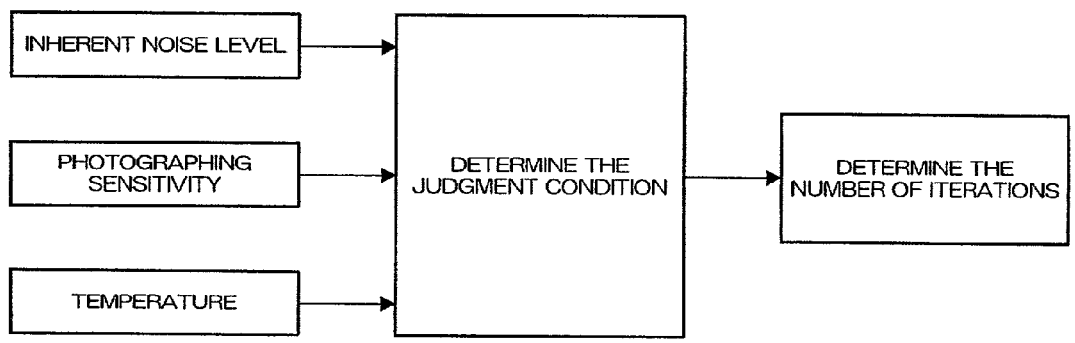
FIG. 11 is a block diagram showing judgment condition for determining the number of iterative calculations.

The noise level can be set for each of cameras in advance. Therefore, the noise level inherent in the camera is stored in the storage section 51. The noise level changes in accordance with the sensitivity in photographing. Generally, when the sensitivity becomes two times an ordinary sensitivity, the noise level becomes two times the ordinary one. Further, the temperature is measured by the temperature sensor 52. Generally, as the temperature increases, the noise level becomes high. Thus, as shown in FIG. 11, the number of iterations is determined based on the inherent noise level, the photographing sensitivity and the temperature in photographing. Although the noise level inherent in the camera is in advance set in this embodiment, the noise level may be appropriately measured from the captured image. Further, by taking both the filter size and the noise level into consideration, it is possible to control the number of iterations more effectively.

After a judgment condition for ending the iterative calculations is determined, the judgment condition and the initial image $X_0(i,j)$ are temporarily stored in the RAM 42 (#33). Then, image correction is performed from the initial image $X_0(i,j)$ temporarily stored in the RAM 42, the degradation function H obtained in photographing and the captured image $Y(i,j)$ to provide a renewed image $X_1(i,j)$ (#34). Subsequently, end judgment of the iterative calculations of Step #35 is performed utilizing the judgment condition temporarily stored in the RAM 42.

If the result is No in the end judgment in the step #35, the process returns to the step #33, and the initial image $X_0(i,j)$ temporarily stored in the RAM 42 is deleted to temporarily store the renewed image $X_1(i,j)$ in the RAM 42. Then, image correction is performed from the renewed image $X_1(i,j)$ temporarily stored in the RAM 42, the degradation function H obtained in photographing and the captured image $Y(i,j)$ to provide a new renewed image $X_2(i,j)$ (#34). Subsequently, end judgment of Step 35 is performed utilizing the judgment condition temporarily stored in the RAM 42. If No in Step #35, the process returns to Step #33 to repeat the same process steps. If Yes in the end judgment in Step #35, the renewed image $X_{n-1}(i,j)$ stored in the RAM 42 is recorded in the recoding medium 36 as a restored image (#36). As described above, when the number of iterations is controlled in accordance with the restoration judgment condition such as the size of a degradation function or in accordance with the image quality such as a noise level, the calculation of a residual is unnecessary, so that the computing time can be shortened.

Although the present invention has been fully described by way of examples with reference to the accompanying drawings, it is to be noted that various change and such changes and modifications depart from the scope of the present invention, they should be construed as being including therein.

What is claimed is:

1. An image processing apparatus comprising:
   a image processor for performing an image restoration by utilizing iterative calculations based on a captured image and a degradation function;
   a first calculator for calculating a residual at each time of iteration in the iterative calculations;
   a second calculator for calculating a rate of variation of the residual calculated by the first calculator, said variation is based on difference of the residual between previous and next calculation of said first calculator; and
   a judger for judging that the iterative calculations are converged when the rate of variation calculated by said second calculator becomes equal to or lower than a predetermined threshold value, wherein
   said degradation function is attributable to a specific condition of an image capturing device capturing said captured image, and
   the residual is a difference between an image before degradation and an image after degradation by the degraded function.

2. The image processing apparatus according to claim 1, wherein said first calculator calculates a residual with respect to the entirety or only a part of the image.

3. The image processing apparatus according to claim 1, wherein said degradation function is based on out-of-focus when the captured image is captured.

4. The image processing apparatus according to claim 1, wherein said degradation function is based on camera-shake when the captured image is captured.

5. The image processing apparatus according to claim 1, wherein said degradation function is based on aberration of an image capturing device capturing said captured image.

6. The image processing apparatus according to claim 1, wherein said degradation function is based on an optical low-pass filter of an image capturing device capturing said captured image.

7. A program product containing a program for executing an image processing, in which execution of said program by a computer allows said computer to execute the steps of:
   performing an image restoration by utilizing iterative calculations based on a captured image and a degradation function;
   calculating a residual at each time of iteration in the iterative calculations;
   a second calculator for calculating a rate of variation of the-residual calculated by the first calculator, said variation is based on difference of the residual between previous and next calculation of said first calculator; and
   judging that the iterative calculations are converged when the calculated rate of variation becomes equal to or lower than a predetermined threshold value, wherein
   said degradation function is attributable to a specific condition of an image capturing device capturing said captured image, and
   the residual is a difference between an image before degradation and an image after degradation by the degraded function.

8. An image processing apparatus comprising:
   a image processor for performing an image restoration by utilizing iterative calculations based on a captured image and a degradation function; and
   a setter for setting a number of iterative calculations prior to starting of said image restoration in accordance with a photographing state of the captured image, wherein said image processor conducts iterative calculations the number of times set by said setters, the photographing state is a photographing environment of the captured image, and the photographing environment is a temperature.

9. The image processing apparatus according to claim 8, wherein the photographing state is a size of a degradation filter of the captured image.

10. The image processing apparatus according to claim 8, wherein the photographing state is an image quality of the captured image.

11. The image processing apparatus according to claim 10, wherein the image quality is a noise level inherent in the image processing apparatus.

12. The image processing apparatus according to claim 8, wherein said image processor end off the conducting iterative calculation only based on the number regardless a condition of a restored image.

13. A program product containing a program for executing an image processing, in which execution of said program by a computer allows said computer to execute the steps of:

setting a number of iterative calculations prior to starting of said image restoration in accordance with a photographing state of a captured image, performing an image restoration by utilizing iterative calculations based on the captured image and a degradation function, and performing said image restoration step the number of times set by said setting step, wherein the photographing state is a photographing environment of the captured image, and the photographing environment is a temperature.

* * * * *